US009806612B2

(12) United States Patent
Zhai

(10) Patent No.: US 9,806,612 B2
(45) Date of Patent: Oct. 31, 2017

(54) SYSTEMS AND METHODS OF ENERGY SAVING IN A BATTERY CHARGING SYSTEM

(71) Applicant: Grenotek Integrated, Inc., Waltham, MA (US)

(72) Inventor: Jerry Zhijun Zhai, Toronto (CA)

(73) Assignee: GRENOTEK INTEGRATED, INC., Waltham, MA (US)

(*) Notice: Subject to any disclaimer, the term of this patent is extended or adjusted under 35 U.S.C. 154(b) by 197 days.

(21) Appl. No.: 14/597,347

(22) Filed: Jan. 15, 2015

(65) Prior Publication Data

US 2015/0207343 A1 Jul. 23, 2015

Related U.S. Application Data

(60) Provisional application No. 61/928,697, filed on Jan. 17, 2014.

(51) Int. Cl.
*H02M 3/158* (2006.01)
*H01M 10/44* (2006.01)
*H02J 7/00* (2006.01)
*H02J 9/00* (2006.01)

(52) U.S. Cl.
CPC .......... *H02M 3/158* (2013.01); *H02J 7/0032* (2013.01); *H02J 9/005* (2013.01)

(58) Field of Classification Search
CPC .................................................. H02M 3/158
USPC ....................................................... 320/112
See application file for complete search history.

(56) References Cited

U.S. PATENT DOCUMENTS

| 5,670,863 | A  | * | 9/1997  | Broell ................... H02J 7/0073 320/145 |
| 7,528,574 | B1 | * | 5/2009  | Adkins ................. H01M 10/44 320/128 |
| 7,616,046 | B2 | * | 11/2009 | Van Bijnen ....... H02M 7/53871 327/494 |
| 7,834,591 | B2 | * | 11/2010 | Hussain ................ H01M 10/44 320/128 |
| 7,915,843 | B2 | * | 3/2011  | Mishima .................. H02P 6/16 318/400.04 |
| 9,065,349 | B2 | * | 6/2015  | Chiang ............. H02M 3/33584 |
| 9,240,696 | B2 | * | 1/2016  | Renken ............... H01M 10/425 |

(Continued)

*Primary Examiner* — Drew A Dunn
*Assistant Examiner* — Jerry D Robbins
(74) *Attorney, Agent, or Firm* — BainwoodHuang

(57) ABSTRACT

Systems and methods of implementing battery charging and energy saving systems in computers, computerized devices, medical devices, industrial devices, wearable devices, wireless charging devices, or any other suitable battery-operable devices. The systems and methods can control output voltages of battery charging systems during multiple charging/discharging periods, including a pre-charging period, a current-controlled charging period, a voltage-controlled charging period, a discharging period, as well as an additional period during which battery packs are removed or otherwise absent from the battery-operable devices or testing is being performed. The systems and methods also provide multiple energy saving modes for the battery-operable devices, allowing transitions between the respective energy saving modes both during operation of the battery-operable devices and during charging of the battery packs within the battery-operable devices.

20 Claims, 11 Drawing Sheets

(56) References Cited

U.S. PATENT DOCUMENTS 9,368,269 B2* 6/2016 Chen .................. H01F 27/28
2015/0357859 A1* 12/2015 Pourdarvish .......... H01M 10/44
320/159

* cited by examiner

*FIG. 1 – Prior art*

| ES MODE | Power Level | PSCTRL Voltage | Battery Charging Status | Main System Status | Adapter Current |
|---|---|---|---|---|---|
| ES0 mode | | 3.0 to 5.0V | Fast charging and initial saturation charging | Normal Operating | Max Current |
| ES1 mode | | 2.0 to 2.7V | Pre-charging or Saturation charging | Low power | I_ES1_TH |
| ES2 mode | | 1.0 to 1.7V | Off | Standby | 0 |

*FIG. 5*

SYSTEMS AND METHODS OF ENERGY SAVING IN A BATTERY CHARGING SYSTEM

CROSS REFERENCE TO RELATED APPLICATIONS

This application claims benefit of the priority of U.S. Provisional Patent Application No. 61/928,697 filed Jan. 17, 2014 entitled SYSTEMS AND METHODS OF ENERGY SAVING IN A BATTERY CHARGING SYSTEM.

TECHNICAL FIELD

The present application relates generally to systems and methods of charging battery power in computers, computerized devices, laptop computers, tablet computers, smartphones, medical devices, industrial devices, wearable devices, wireless charging devices, and/or any other suitable battery-operable devices, and more specifically to systems and methods of implementing battery charging and energy saving systems in such battery-operable devices.

BACKGROUND

A conventional battery charging system for a battery-operable device typically includes an alternating current (AC) adapter input port, a power conversion charger for converting AC power to direct current (DC) power, a filter capacitor, a battery, and a charging current path, which can include a resistor, a battery switch, and one or more associated cables. For example, the battery-operable device can be a laptop computer, a tablet computer, a smartphone, a medical device, an industrial device, etc. In the conventional battery charging system, the power conversion charger can deliver DC power for charging the battery, as well as operating main computer or processor system components (the "main system components") within the battery-operable device. The operation of the main system components is typically separate from the function of charging the battery. For example, the charging of the battery can take place while the main system components are either operating or shutdown. Further, the main system components can operate both while the charging of the battery is in progress and after the charging of the battery has completed, as well as while the battery is removed or otherwise absent from the battery-operable device.

The conventional battery charging system described herein has several drawbacks, however. For example, the conventional battery charging system typically only controls and/or regulates an output voltage of the battery charging system at a common node of the main system components and the filter capacitor, and does not generally control/regulate the voltage of the battery itself. Further, the voltage drop across the charging current path, which can include the resistor, the battery switch, and the associated cable(s), can significantly impact the voltage of the battery, resulting in reduced accuracy of the battery voltage, increased battery charging time, and/or reduced battery capacity.

Moreover, the power conversion charger generally includes power switches (e.g., metal oxide semiconductor field effect transistor (MOSFET) switches) that implement a typical pulse width modulation (PWM) switching scheme, which can result in power losses proportional to the size and/or switching frequency of the respective power switches. Further, while the power conversion charger operates in a low output current mode, such as a system standby mode, the power switches can continue to operate within the typical PWM switching scheme, causing unwanted power consumption and/or power dissipation inside the power conversion charger. Although the level of such unwanted power consumption/dissipation is typically low, it can cause a significant amount of energy to accumulate in situations where the power conversion charger operates in the system standby mode for an extended period of time. Such unwanted power consumption/dissipation can also cause reduced power efficiency under light load conditions, possibly preventing the battery-operable device from meeting certain international standards for energy efficient consumer products, such as the Energy Star™ standards.

It would therefore be desirable to have improved systems and methods of charging battery power that can avoid at least some of the drawbacks of conventional battery charging systems.

SUMMARY

In accordance with the present application, systems and methods are disclosed for implementing battery charging and energy saving systems in computers, computerized devices, laptop computers, tablet computers, smartphones, medical devices, industrial devices, and/or any other suitable battery-operable devices. The disclosed systems and methods can control and/or regulate outputs of battery charging systems during multiple pre-charging, charging, and discharging periods, including current-controlled charging periods and voltage-controlled charging periods, as well as during additional periods while battery packs are removed or otherwise absent from the respective battery-operable devices or while testing is being performed. The disclosed systems and methods also provide multiple energy saving modes for such battery-operable devices.

In one aspect, a battery charging system for delivering battery power to a battery-operable device includes a battery charging controller circuit (also referred to herein as the "battery charging controller" or the "controller"), a power stage, and a battery pack. The battery charging controller includes a digital management core circuit (also referred to herein as the "digital core"), as well as an energy saving circuit component (also referred to herein as the "energy saving component") and a charger mode control circuit component (also referred to herein as the "charger mode control component"), which, in concert, can provide multiple energy saving modes, such as up to three energy saving modes ES0, ES1, ES2 or more, for the battery-operable device. The power stage includes a plurality of power switches (e.g., metal oxide semiconductor field effect transistor (MOSFET) switches) configured to implement an improved pulse width modulation (PWM) switching scheme for providing a battery charging current to the battery pack.

In one mode of operation, the battery charging controller can control and/or regulate an output of the battery charging system during a pre-charging period, a current-controlled charging period, a voltage-controlled charging period, and a discharging period, as well as during an additional period while the battery pack is removed or otherwise absent from the battery-operable device or while testing is being performed. The battery charging system can employ the energy saving mode ES0 as a default energy saving mode during both the current-controlled charging period and the voltage-controlled charging period, as well as during normal system operation of the battery-operable device. The battery charging system can continue to employ the energy saving mode ES0 until an alternating current (AC) adapter current from an AC adapter input port decreases below a predetermined current threshold, causing the battery charging system to transition from the energy saving mode ES0 to the energy saving mode ES1.

While employing the energy saving mode ES1, the battery charging system can reduce the PWM switching frequency of the plurality of power switches within the power stage, advantageously reducing power losses of the power switches and improving power efficiency. The battery charging system can employ the energy saving mode ES1 during the pre-charging period, as well as during low power operating conditions of main computer or processor system components (also referred to herein as the "main system components") within the battery-operable device. As the AC adapter current and the battery charging current continue to decrease, the battery charging system can reduce the PWM switching frequency of the power switches down to a predetermined frequency threshold, causing the battery charging system to transition from the energy saving mode ES1 to the energy saving mode ES2. In the energy saving mode ES2, the battery charging system can terminate the charging of the battery, or further reduce the PWM switching frequency of the power switches.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 5 is a table illustrating possible energy savings while operating the battery charging system of FIG. 3*a* in several different energy saving modes, including a zeroth (ES0) energy saving mode, a first (ES1) energy saving mode, and a second (ES2) energy saving mode;

DETAILED DESCRIPTION

The disclosure of U.S. Provisional Patent Application No. 61/928,697 filed Jan. 17, 2014 entitled SYSTEMS AND METHODS OF ENERGY SAVING IN A BATTERY CHARGING SYSTEM is hereby incorporated herein by reference in its entirety.

Figure 1:
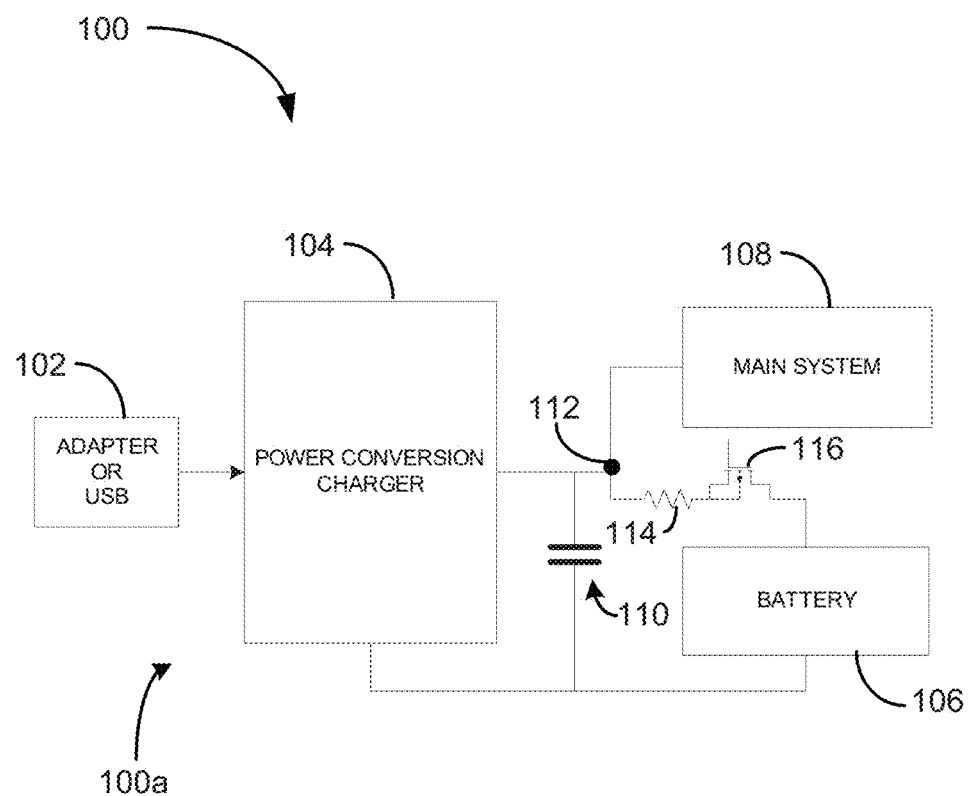
FIG. 1 is a schematic diagram of a conventional battery charging system for delivering battery power to a battery-operable device.

FIG. 1 depicts a conventional battery charging system 100*a* for delivering battery power to a battery-operable device 100. As shown in FIG. 1, the battery-operable device 100 includes main computer or processor system components (also referred to herein as the "main system components") 108, as well as the conventional battery charging system 100*a*, which includes an alternating current (AC) adapter input port or Universal Serial Bus (USB) port 102, a power conversion charger 104, a filter capacitor 110, a resistor 114, a battery switch 116, and a battery 106. For example, the battery-operable device 100 can be a laptop computer, a tablet computer, a smartphone, a medical device, an industrial device, or any other suitable battery-operable device.

In the conventional battery charging system 100*a* of FIG. 1, the power conversion charger 104 can deliver power for charging the battery 106 and for operating the main system components 108. The operation of the main system components 108 is separate from the function of charging the battery 106. For example, the charging of the battery 106 can take place while the main system components 108 are either operating or shutdown. Further, the main system components 108 can operate while the function of charging the battery 106 is either in progress or terminated, and while the battery 106 is removed or otherwise absent from the battery-operable device 100.

The conventional battery charging system 100*a* has several drawbacks, however. For example, the conventional battery charging system 100*a* typically only controls and/or regulates an output voltage of the battery charger system 100*a* at a common node 112 of the main system components 108 and the filter capacitor 110, and does not generally control/regulate the voltage of the battery 106 itself. Further, the voltage drop across a charging current path to the battery 106, which includes the resistor 114, the battery switch 116, and one or more associated cables, can significantly impact the voltage of the battery 106, resulting in reduced accuracy of the battery voltage, increased battery charging time, and/or reduced battery capacity.

Moreover, the power conversion charger 104 generally includes power switches (e.g., metal oxide semiconductor field effect transistor (MOSFET) switches) that implement a typical pulse width modulation (PWM) switching scheme, which can result in power losses proportional to the size and/or the PWM switching frequency of the respective power switches. Further, while the power conversion charger 104 operates in a low output current mode, such as a system standby mode, the power switches can continue to operate within the typical PWM switching scheme, causing unwanted power consumption and/or power dissipation inside the power conversion charger 104. Although the level of such unwanted power consumption/dissipation is typically low, it can cause a significant amount of energy to accumulate in situations where the power conversion charger 104 operates in the system standby mode for an extended period of time. Such unwanted power consumption/dissipation can also cause reduced power efficiency under light load conditions, possibly preventing the battery-operable device 100 from meeting certain international standards for energy efficient consumer products, such as the Energy Star™ standards.

Figure 2:
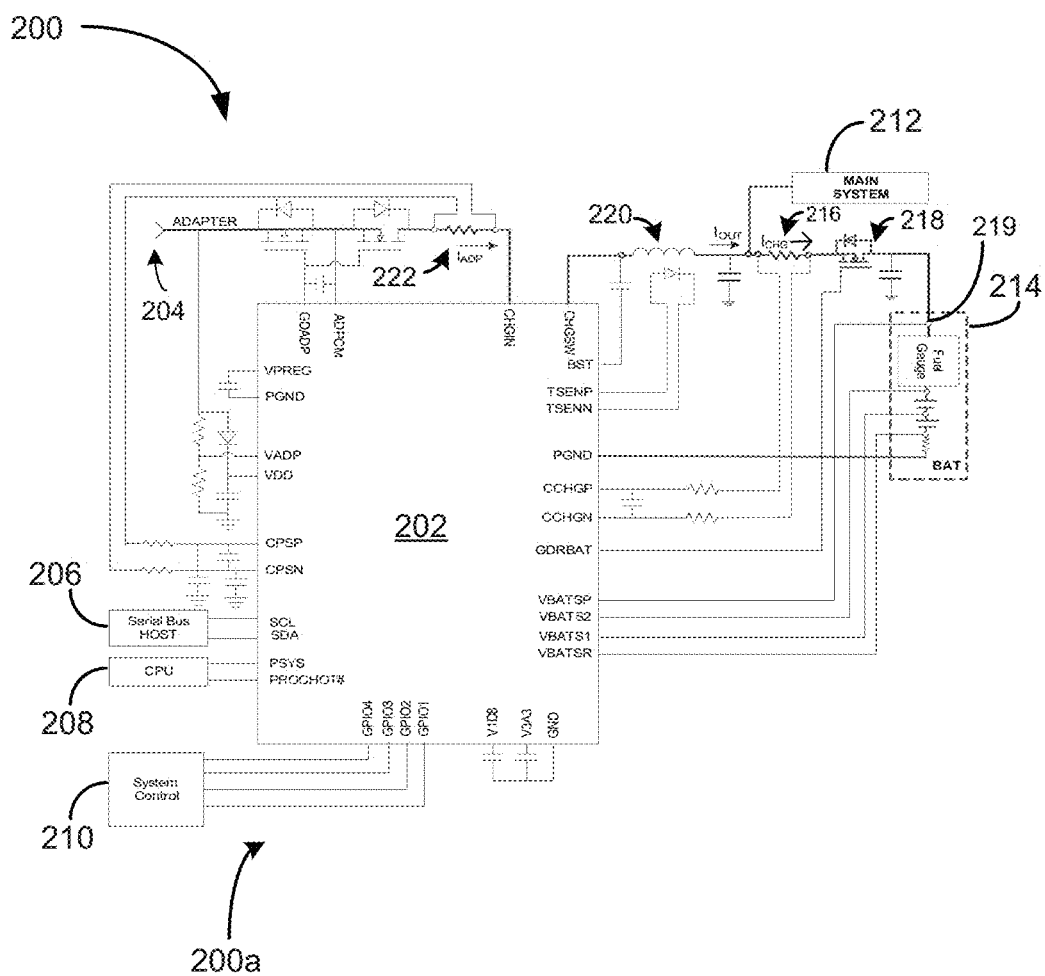
FIG. 2 is a schematic diagram of an exemplary target configuration of an exemplary battery charging system, in accordance with the present application.

FIG. 2 depicts an illustrative embodiment of an exemplary target configuration of an exemplary battery charging system 200a for delivering battery power to a battery-operable device 200, in accordance with the present application. As shown in FIG. 2, the battery-operable device 200 includes main computer or processor system components (the "main system components") 212, as well as the battery charging system 200a, which includes a battery charging controller circuit 202 (also referred to herein as the "battery charging controller" or the "controller"), a serial bus host 206, a central processing unit (CPU) 208, a system control circuit 210, and a battery pack 214. For example, the battery pack 214 can include one or more battery cells for lithium-ion batteries, or any other suitable batteries.

Figure 3A:
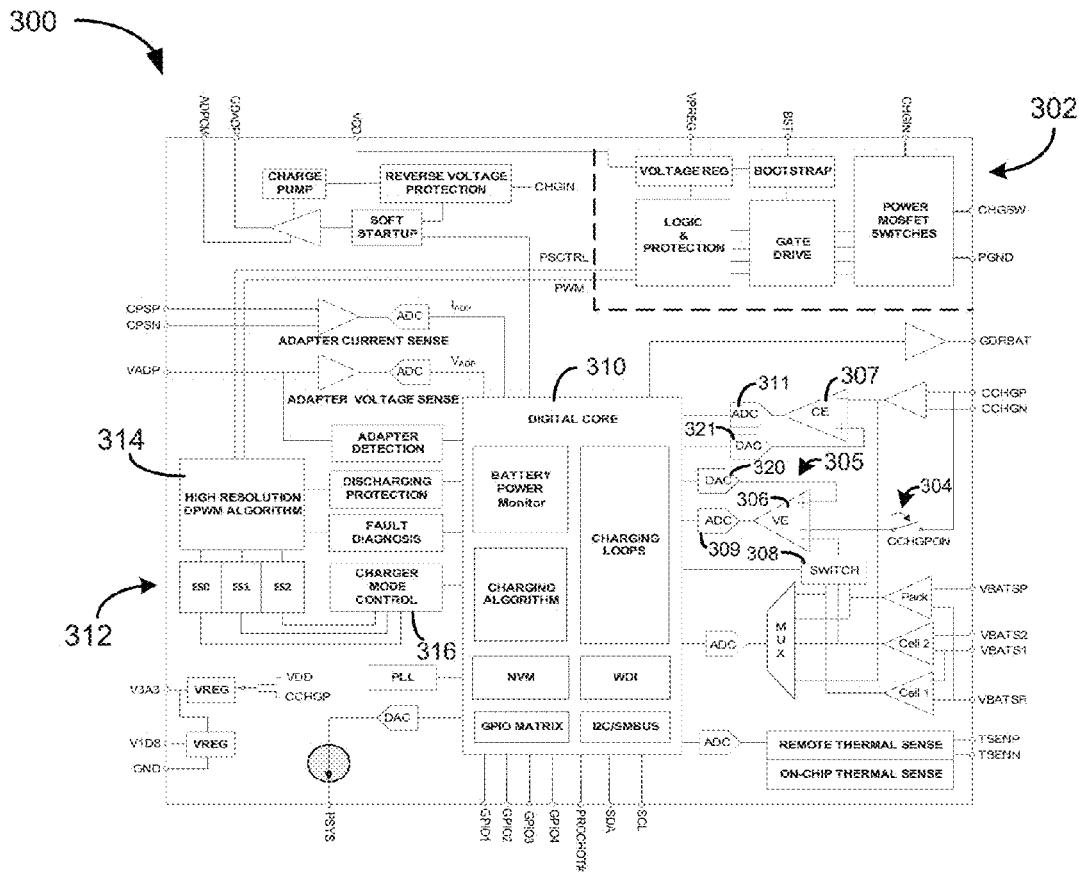
FIG. 3*a* is a schematic diagram of the battery charging system of FIG. 2.
Figure 3B:
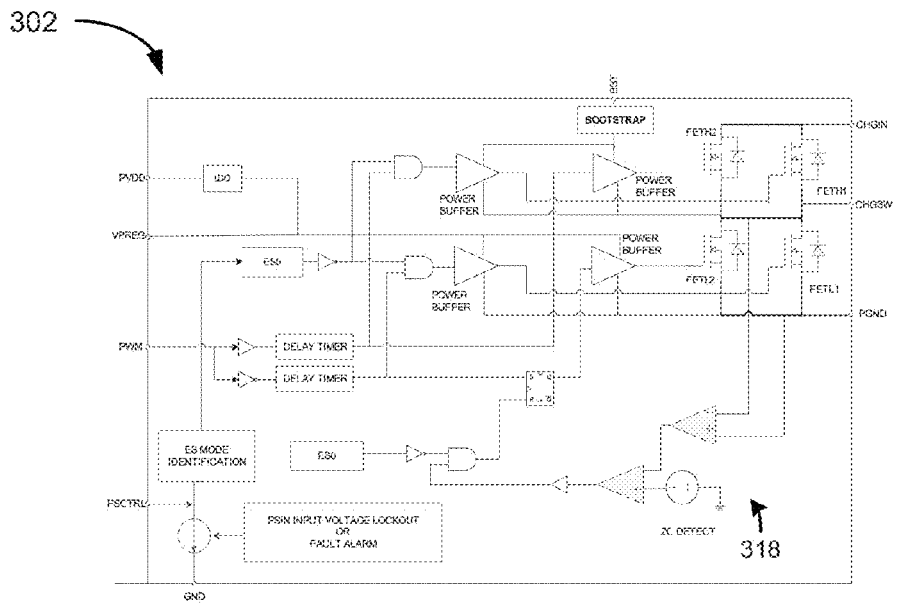
FIG. 3*b* is a schematic diagram of an exemplary power stage included in the battery charging system of FIG. 3*a*.

FIG. 3a depicts a detailed view 300 of the battery charging controller 202 of FIG. 2, and FIG. 3b depicts a power stage 302 included in the battery charging controller 300 of FIG. 3a. As shown in FIG. 3a, the battery charging controller 300 has (1) a switch 304 (CCHGPON), (2) a voltage regulation loop including a voltage error (VE) comparator 306, a switch 308, an analog-to-digital converter (ADC) 309, and a digital-to-analog converter (DAC) 320, (3) a current regulation loop including a current error (CE) comparator 307, an ADC 311, and a DAC 321, (4) a digital management core circuit 310 (also referred to herein as the "digital core"), (5) an energy saving circuit component 312 (also referred to herein as the "energy saving component"), (6) a charger mode control circuit component 316 (also referred to herein as the "charger mode control component"), and (7) a circuit component for implementing a high resolution digital PWM (DPWM) algorithm 314 (also referred to herein as the "DPWM algorithm component"). For example, the digital core 310 (see FIG. 3a) can include at least a programmable logic circuit, a finite state machine, a microprocessor, and/or any other suitable digital circuit or circuitry capable of processing analog and/or digital signals for managing and/or controlling the charging of battery power for the battery-operable device 200 (see FIG. 2).

Figure 4:
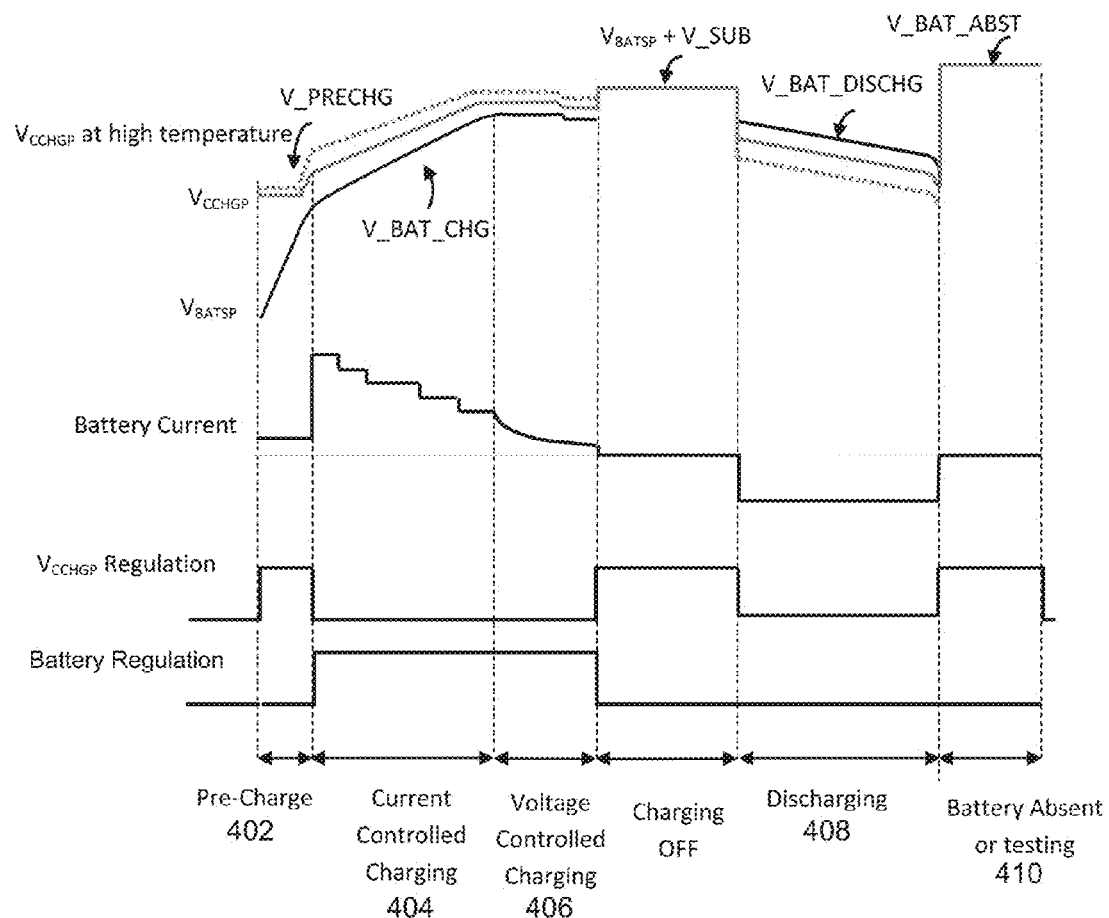
FIG. 4 is a diagram illustrating an exemplary technique for controlling and/or regulating an output of the battery charging system of FIG. 3*a*.

In an exemplary mode of operation, the battery charging controller 300 (see FIG. 3a) can control and/or regulate an output of the battery charging system 200a during multiple pre-charging, charging, and discharging periods, including a pre-charging period 402, a current-controlled charging period 404, a voltage-controlled charging period 406, and a discharging period 408, as well as an additional period 410 during which the battery pack 214 is removed or otherwise absent from the battery-operable device 200 or testing is being performed (such additional period also referred to herein as the "battery absent/testing period") (see also FIG. 4). During the pre-charging period 402, the battery charging controller 300 is operative to regulate an output voltage of the battery charging system 200a (i.e., the voltage at a node CCHGP, such voltage also referred to herein as "$V_{CCHGP}$"; see FIGS. 2 and 3a) by monitoring a voltage across a current sense resistor 216 (see FIG. 2) connected between the node CCHGP and another node CCHGN (see FIGS. 2 and 3a).

More specifically, during the pre-charging period 402 (see FIG. 4), the battery charging controller 300 operates to close the switch 304 (see FIG. 3a), allowing the voltage error (VE) comparator 306 to receive the voltage $V_{CCHGP}$ as an input. Further, the digital core 310 provides, in digital form, a specified precharge voltage level, namely, a voltage V_PRE-CHG (see FIG. 4), to the DAC 320 (see FIG. 3a), which converts the voltage V_PRECHG to analog form, and provides the voltage V_PRECHG in analog form to the voltage error (VE) comparator 306. The digital core 310 also controls the switch 308 to place it in a high impedance state, preventing any of the battery pack voltage (also referred to herein as "VBATSP" or "$V_{BATSP}$") or battery cell voltages (also referred to herein as "VBATS1" and "VBATS2") from being provided as input(s) to the voltage error (VE) comparator 306. Having received the voltages $V_{CCHGP}$ and V_PRECHG as inputs, the voltage error (VE) comparator 306 compares the voltage $V_{CCHGP}$ to the voltage V_PRECHG, and, based at least on the comparison, provides an analog voltage proportional to a voltage error deviation between the voltages $V_{CCHGP}$ and V_PRECHG to the ADC 309, which, in turn, provides a digital signal representative of the voltage error deviation to the digital core 310.

Using the voltage error deviation between the voltages $V_{CCHGP}$ and V_PRECHG, the voltage regulation loop (which includes the VE comparator 306, the switch 308, the ADC 309, and the DAC 320) can control and/or regulate the voltage $V_{CCHGP}$ during the pre-charging period 402 (see FIG. 4), effectively setting the voltage $V_{CCHGP}$ to the specified precharge voltage level V_PRECHG. Such regulation of the voltage $V_{CCHGP}$ is denoted by the high logical level of a waveform "$V_{CCHGP}$ Regulation" during the pre-charging period 402, as illustrated in FIG. 4. It is noted that the value of the voltage V_PRECHG can be stored in digital form in a register in non-volatile memory (NVM) within the digital core 310 (see FIG. 3a).

It is further noted that, during the pre-charging period 402 (see FIG. 4), the digital core 310 (see FIG. 3a) can apply, at a node GDRBAT (see FIGS. 2 and 3a), one or more specified gate drive voltages to a battery switch 218 (see FIG. 2) connected between the node CCHGN and a node 219 (see FIG. 2) at which the battery pack voltage $V_{BATSP}$ is applied. In the pre-charging period 402 (see FIG. 4), the battery pack voltage $V_{BATSP}$ is relatively low, typically less than about 3 volts, depending upon the battery cell characteristics of the battery pack 214 (see FIG. 2). Accordingly, by applying the specified gate drive voltage(s) to the battery switch 218, the digital core 310 can operate the battery switch 218 as a linear regulator to compensate a voltage drop across the node CCHGN and the node 219 along a charging current path, thereby allowing the battery charging system 200a to better withstand the voltage drop across the charging current path.

During the current-controlled charging period 404 (see FIG. 4) and the voltage-controlled charging period 406 (see also FIG. 4), the battery charging controller 300 (see FIG. 3a) operates to open the switch 304, preventing the voltage error (VE) comparator 306 from receiving the voltage $V_{CCHGP}$ as an input. Because regulation of the voltage $V_{CCHGP}$ does not occur during the current-controlled and voltage-controlled charging periods 404, 406, the $V_{CCHGP}$ Regulation waveform (see FIG. 4) has a low logical level during the respective current-controlled and voltage-controlled charging periods 404, 406.

In the current-controlled charging period 404 (see FIG. 4) and the voltage-controlled charging period 406 (see also FIG. 4), the digital core 310 (see FIG. 3a) operates to select, via the switch 308, the battery pack voltage $V_{BATSP}$ for subsequent application to the voltage error (VE) comparator 306 as an input. The digital core 310 also operates to provide, in digital form, a specified target voltage level for the battery pack voltage $V_{BATSP}$ to the DAC 320, which converts the specified target voltage level to analog form, and provides the target voltage level in analog form to the voltage error (VE) comparator 306. Having received the battery pack voltage $V_{BATSP}$ and the corresponding target voltage level as inputs, the voltage error (VE) comparator 306 compares the battery pack voltage $V_{BATSP}$ to the specified target voltage level, and, based at least on the comparison, provides an analog voltage proportional to a voltage error deviation between the battery pack voltage $V_{BATSP}$ and the specified target voltage level to the ADC 309, which, in turn, provides a digital signal representative of the voltage error deviation to the digital core 310. It is noted that, during the current-controlled charging and voltage-controlled charging periods 404, 406, the battery pack voltage $V_{BATSP}$ is also referred to as "V_BAT_CHG", as illustrated in FIG. 4.

Using the voltage error deviation between the battery pack voltage $V_{BATSP}$ and the specified target voltage level, the voltage regulation loop (which includes the VE comparator 306, the switch 308, the ADC 309, and the DAC 320; see FIG. 3a) can control and/or regulate the battery pack voltage $V_{BATSP}$. Such regulation of the battery pack voltage $V_{BATSP}$ during the current-controlled charging period 404 and the voltage-controlled charging period 406 is denoted by the high logical level of a waveform "Battery Regulation", as illustrated in FIG. 4. It is noted that the value of the specified target voltage level for the battery pack voltage $V_{BATSP}$ can be stored in digital form in a register in the non-volatile memory (NVM) within the digital core 310 (see FIG. 3a).

With further regard to the current-controlled and voltage-controlled charging periods 404, 406 (see FIG. 4), an analog voltage proportional to a battery charging current ($I_{CHG}$; see FIG. 2) across the current sense resistor 216 can be applied to the current error (CE) comparator 307 (see FIG. 3a) as an input. The digital core 310 can further operate to provide, in digital form, a specified target voltage level for the analog voltage proportional to the battery charging current $I_{CHG}$ to the DAC 321, which can convert the specified target voltage level to analog form, and provide the target voltage level in analog form to the current error (CE) comparator 307. Having received the analog voltage proportional to $I_{CHG}$ and the corresponding target voltage level as inputs, the current error (CE) comparator 307 can compare the analog voltage proportional to $I_{CHG}$ to the specified target voltage level, and, based at least on the comparison, provide a further analog voltage proportional to a current error deviation between the analog voltage proportional to $I_{CHG}$ and the specified target voltage level to the ADC 311, which, in turn, can provide a digital signal representative of the current error deviation to the digital core 310. It is noted that the value of the specified target voltage level for the analog voltage proportional to $I_{CHG}$ can be stored in digital form in a register in the non-volatile memory (NVM) within the digital core 310 (see FIG. 3a).

Such current-controlled charging and voltage-controlled charging of a battery pack, as well as the generation of the battery charging current $I_{CHG}$ (also referred to herein as the "Battery Current"; see FIG. 4), are each further described in co-pending U.S. patent application Ser. No. 14/534,439 filed Nov. 6, 2014 entitled SYSTEMS AND METHODS OF ADAPTIVE BATTERY CHARGING, the disclosure of which is hereby incorporated herein by reference in its entirety.

Figure 6:
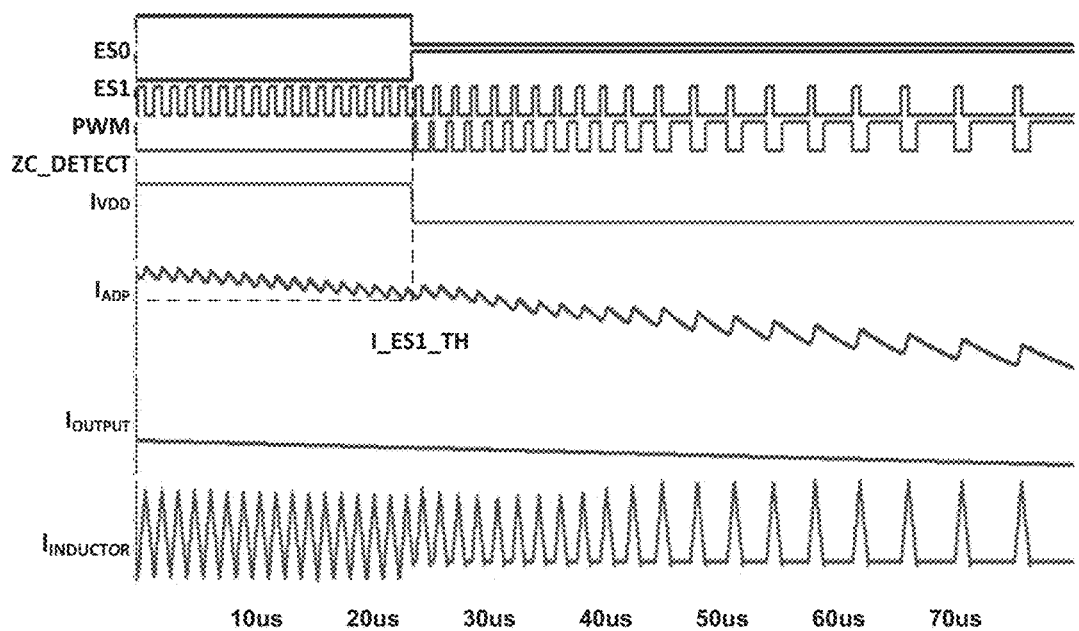
FIG. 6 is a diagram illustrating a transition from the energy saving mode ES0 to the energy saving mode ES1, during operation of the battery charging system of FIG. 3*a*.
Figure 8:
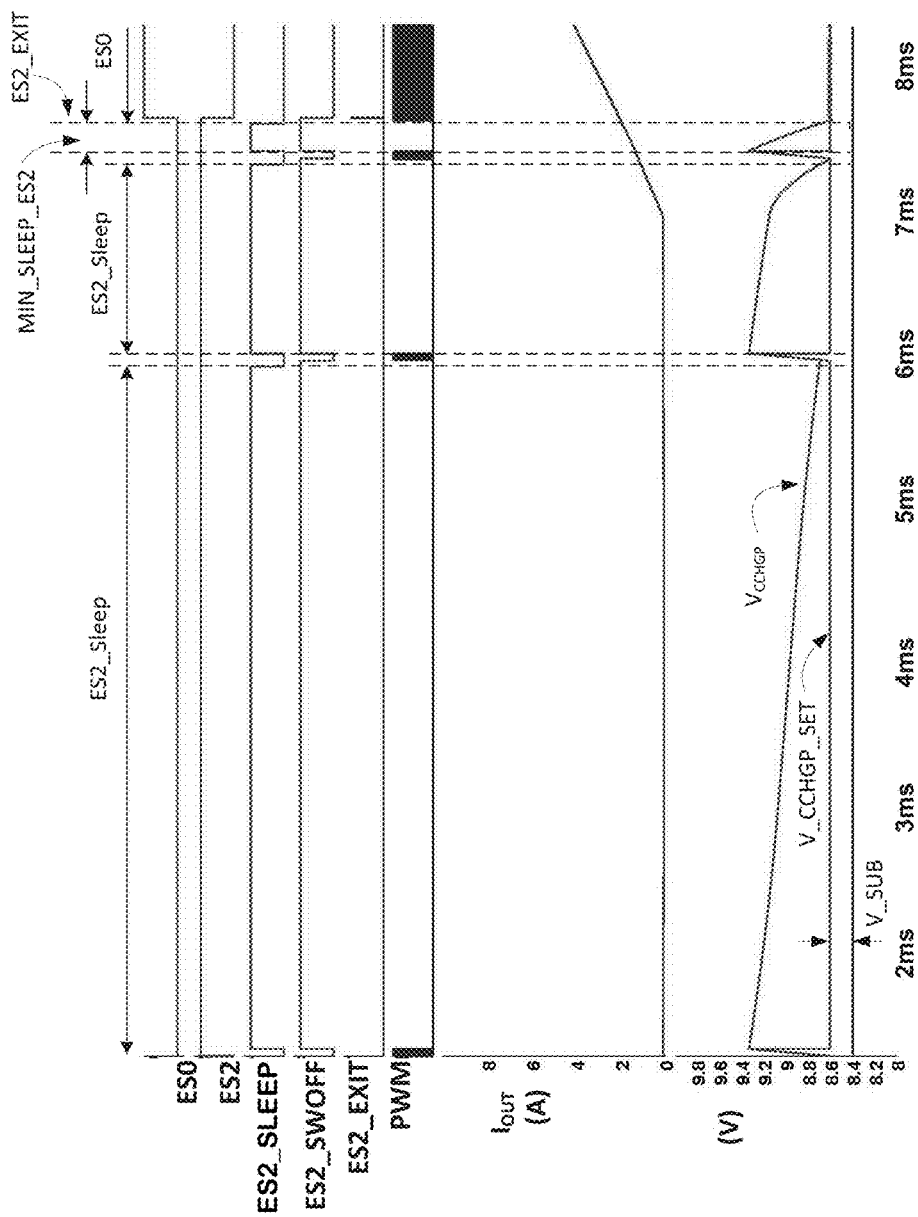
FIG. 8 is a diagram illustrating exemplary operation of the battery charging system of FIG. 3*a* while operating in the energy saving mode ES2.

As described herein, the battery charging controller 300 opens the switch 304 (see FIG. 3a) during each of the current-controlled charging and voltage-controlled charging periods 404, 406 (see FIG. 4), and therefore the controller 300 does not employ the voltage $V_{CCHGP}$ while generating an output current (also referred to herein as "$I_{OUT}$", "$I_{OUTPUT}$", or the "battery charger output current"; see FIGS. 2, 6, and 8) of the battery charging system 200a. Such a voltage $V_{CCHGP}$ can be expressed as the sum of the battery pack voltage $V_{BATSP}$ and the compensated voltage drop across the charging current path, which includes the current sense resistor 216 and the battery switch 218, as well as a battery connector (not numbered) and any associated cable(s). The voltage drop across the charging current path typically has an adverse effect on the voltage $V_{CCHGP}$ and/or the battery charging current $I_{CHG}$. By compensating the voltage drop across the charging current path, as described herein, such an adverse effect can be substantially avoided, resulting in enhanced battery charging voltage precision and enhanced battery capacity, as well as reduced battery charging times.

In one embodiment, the battery switch 218 (see FIG. 2) can be a P-channel or N-channel type power MOSFET device, which can have a conduction resistance that varies in a range up to about 30% from part-to-part. Further, the resistive characteristics of a printed circuit board (PCB) trace disposed along the charging current path that includes the battery switch 218 can vary by up to about 15% during manufacturing. While such resistive parameters are relatively high in the battery-operable device 200, the voltage difference between the voltage $V_{CCHGP}$ and the battery pack voltage $V_{BATSP}$ also tends to be high. As a result, such resistance parameters have a reduced impact on battery charging during the current-controlled and voltage-controlled charging periods 404, 406 (see FIG. 4). It is noted that, as temperature increases, such resistive parameters can increase the voltage drop across the charging current path. It is further noted that changes in the voltage drop across the charging current path, which can be as high as 300 millivolts (equal to approximately the voltage of a single battery cell in high current charging), generally do not impose an over-voltage condition on the battery cells of the battery pack 214.

During a period following the completion of the voltage-controlled charging period 406 (such period referred to herein as the "Charging OFF" period; see FIG. 4), the battery charging controller 300 (see FIG. 3a) again operates to close the switch 304 with the switch 308 placed in the high impedance state (preventing any of the battery pack voltage $V_{BATSP}$ or battery cell voltages VBATS1, VBATS2 from being provided as input(s) to the VE comparator 306), thereby allowing the voltage error (VE) comparator 306 to receive the voltage $V_{CCHGP}$ as an input, and to control and/or regulate the voltage $V_{CCHGP}$. Such regulation of the voltage $V_{CCHGP}$ is denoted by the high logical level of the $V_{CCHGP}$ Regulation waveform during the Charging OFF period, as illustrated in FIG. 4. During the Charging OFF period, the voltage $V_{CCHGP}$ is regulated to be equal to "$V_{BATSP}$+V_SUB" (see FIG. 4), in which "V_SUB" (see FIGS. 4 and 8) is a programmable "headroom" voltage value that can be set to about 0.5 volts, or any other suitable value.

During a subsequent period 408 (see FIG. 4) following the completion of the Charging OFF period (such subsequent period also referred to herein as the "discharging period"; see FIG. 4), the digital core 310 can apply, at the node GDRBAT (see FIGS. 2 and 3a), one or more specified gate drive voltages to actuate the battery switch 218 (see FIG. 2), thereby allowing the battery pack 214 to deliver battery power to the main system components 212 through the battery switch 218. It is noted that, during the discharging period 408, the battery pack voltage $V_{BATSP}$ (also referred to herein as "V_BAT_DISCHG"; see FIG. 4) can be slightly higher than the voltage $V_{CCHGP}$.

It is further noted that the battery-operable device 200 (see FIG. 2) can allow the main system components 212 to operate during the battery absent/testing period 410 (see FIG. 4) while the battery pack 214 is removed or otherwise absent from the battery-operable device 200 or while testing is being performed. In this case, the battery charging controller 300 can receive, at a node CHGIN (see FIGS. 2 and 3a), an AC adapter current from an AC/DC power adapter (also referred to herein as the "AC adapter"; not shown) connected to an AC adapter input port 204 (see FIG. 2), and the digital core 310 (see FIG. 3a) can apply, at the GDRBAT node, one or more specified gate drive voltages to deactivate the battery switch 218 (see FIG. 2). Further, the battery charging controller 300 (see FIG. 3) can operate to close the switch 304 with the switch 308 placed in the high impedance state (preventing any of the battery pack voltage $V_{BATSP}$ or battery cell voltages VBATS1, VBATS2 from being provided as input(s) to the VE comparator 306), thereby allowing the voltage error (VE) comparator 306 to receive the voltage $V_{CCHGP}$ as an input, and to control and/or regulate the voltage $V_{CCHGP}$. Such regulation of the voltage $V_{CCHGP}$ is denoted by the high logical level of the $V_{CCHGP}$ Regulation waveform during the battery absent/testing period 410, as illustrated in FIG. 4. It is noted that, during the battery absent/testing period 410, the voltage $V_{CCHGP}$ can be regulated to be equal to "V_BAT_ABST" (see FIG. 4), which is a programmable voltage value that can be set to about 8 volts, 10 volts, 12 volts, or any other suitable value.

Energy Saving Modes

As described herein with reference to FIG. 3a, the battery charging controller 300 includes the energy saving component 312 and the charger mode control component 316, which, in concert, can provide multiple energy saving modes, such as up to three energy saving modes ES0, ES1, ES2 or more, for the battery charging system 200a (see FIG. 2). Descriptions of the respective energy saving modes ES0, ES1, ES2 are provided hereinbelow.

Energy Saving Mode ES0

Having received the digital signal representations of the voltage error deviation and the current error deviation, the digital core 310 (see FIG. 3a) provides, via the charger mode control component 316, the respective voltage/current error deviation signals to the energy saving component 312, which, in conjunction with the DPWM algorithm component 314, operates to minimize the respective voltage and current error deviations. Further, the DPWM algorithm component 314 generates a control signal PSCTRL and a charging signal (also referred to herein as the "charging signal PWM"; see FIG. 6), and provides the control signal PSCTRL and the charging signal PWM to the power stage 302 (such power stage also referred to herein as the "PWM power stage"; see FIGS. 3a and 3b), which uses the respective control and charging signals PSCTRL, PWM to generate the battery charger output current $I_{OUT}$ (see FIG. 2).

As shown in the table of FIG. 5, while the battery charging system 200a (see FIG. 2) operates in the energy saving mode ES0, a highest level of power among the energy saving modes ES0, ES1, ES2 can be provided by the battery charging controller 300 (see FIG. 3a), the control signal PSCTRL can be in the range of about 3.0 to 5.0 volts, the status of battery charging is denoted as fast charging/initial saturation charging, the main system components 212 (see FIG. 2) can operate in accordance with a normal operating status, and the AC adapter can provide a level of AC adapter current $I_{ADP}$ ranging from a maximum current level to a predetermined current threshold level (I_ES1_TH; see FIG. 6).

Operation of the battery charging system 200a (see FIG. 2) in the energy saving mode ES0 is denoted by the high logical level of a waveform "ES0", as illustrated in FIG. 6. Due to the PWM switching of four MOSFET switches FETH1, FETH2, FETL1, FETL2 within the PWM power stage 302 (see FIGS. 3a and 3b), a ripple current (also referred to herein as "$I_{INDUCTOR}$"; see FIG. 6) flows from a node CHGSW (see FIGS. 2 and 3a) through an inductor 220 (see FIG. 2) within the battery-operable device 200. The ripple current $I_{INDUCTOR}$ flowing through the inductor 220 is continuous in a PWM cycle. The peak-to-peak amplitude of such a ripple current $I_{INDUCTOR}$ can be about 20-30% of the maximum DC output current of the battery charging system 200a. As shown in FIG. 6, the ripple current $I_{INDUCTOR}$ can be always positive, or the low peaks of the ripple current $I_{INDUCTOR}$ can be slightly negative. It is noted that, while operating in the energy saving mode ES0, a zero current detection circuit 318 (ZC_DETECT; see FIGS. 3b and 6) within the power stage 302 is disabled. The battery charging system 200a can operate in the energy saving mode ES0 until the AC adapter current $I_{ADP}$ from the AC adapter input port 204 (see FIG. 2) decreases to less than the predetermined current threshold level I_ES1_TH, the value of which can be stored in digital form in a register in the non-volatile memory (NVM) within the digital core 310 (see FIG. 3a).

While the battery charging system 200a operates in the energy saving mode ES0, the DPWM algorithm component 314 (see FIG. 3a) provides the control signal PSCTRL to the power stage 302 (see FIGS. 3a and 3b), which uses the control signal PSCTRL to control the operation of the four MOSFET switches FETH1, FETH2, FETL1, FETL2 (see FIG. 3b). As illustrated in FIG. 3b, the MOSFET switches FETH1, FETH2 are two power MOSFET devices connected in parallel on the high side of a buck converter switch, while the MOSFET switches FETL1, FETL2 are two power MOSFET devices connected in parallel on the low side of the buck converter switch. While operating in the energy saving mode ES0, the voltages of the MOSFET switches FETH1, FETH2, measured from gate-to-source, switch "up" and "down" at substantially the same time in a PWM cycle. The MOSFET switches FETH1, FETH2, FETL1, FETL2 can be controlled such that all four of the MOSFET switches are active, or just two of the MOSFET switches are active, as further described hereinbelow (such active MOSFET switches also referred to herein as the "active switch elements"). It is noted that the silicon chip size ratio of the MOSFET switches FETH1 to FETH2, as well as the silicon chip size ratio of the MOSFET switches FETL1 to FETL2, are not limited to any particular percentage and can be any suitable values to fit a desired efficiency optimization.

Energy Saving Mode ES1

As shown in the table of FIG. 5, while the battery charging system 200a operates in the energy saving mode ES1, an intermediate level of power among the energy saving modes ES0, ES1, ES2 can be provided by the battery charging controller 300 (see FIG. 3a), the control signal PSCTRL can be in the range of about 2.0 to 2.7 volts, the status of battery charging is denoted as pre-charging/saturation charging, the main system components 212 (see FIG. 2) can operate in accordance with a low power operating status, and the AC adapter can provide a level of AC adapter current $I_{ADP}$ ranging from the predetermined current threshold level I_ES1_TH to a second reduced current threshold level.

Operation of the battery charging system 200a in the energy saving mode ES1 is denoted by the high logical level of a waveform "ES1", as illustrated in FIG. 6. The battery charging system 200a enters the energy saving mode ES1 when the AC adapter current $I_{ADP}$ from the AC adapter input port 204 decreases a sufficient amount to reach the predetermined current threshold level I_ES1_TH (see FIG. 6), thereby causing the charger mode control component 316 to transition the energy saving mode of the energy saving component 312 from the energy saving mode ES0 to the energy saving mode ES1. It is noted that a suitable filter may be employed to filter the AC adapter current $I_{ADP}$ to avoid false triggering of the transition from the energy saving mode ES0 to the energy saving mode ES1.

Once in the energy saving mode ES1, the PWM power stage 302 (see FIG. 3b) operates as follows. The gate voltage of the high side MOSFET switch FETH2 is maintained at a low voltage level, causing the MOSFET switch FETH2 to become essentially dormant without any PWM switching, while the high side MOSFET switch FETH1 switches "on" and "off" in PWM cycles. Likewise, the gate voltage of the low side MOSFET switch FETL2 is maintained at a low voltage level, causing the MOSFET switch FETL2 to become essentially dormant without any PWM switching, while the low side MOSFET switch FETL1 switches "on" and "off" in PWM cycles. Accordingly, just two of the four MOSFET switches FETH1, FETH2, FETL1, FETL2 (see FIG. 3b) are active, namely, the active switch elements FETH1 and FETL1. In addition, the zero current detection circuit 318 (ZC_DETECT; see FIG. 6) within the power stage 302 is enabled.

When the ripple current $I_{INDUCTOR}$ (see FIG. 6) approaches the zero current level in the energy saving mode ES1, the low side MOSFET switch FETL1 is turned "off", preventing the ripple current $I_{INDUCTOR}$ from going into the negative range. Further, as the AC adapter current $I_{ADP}$ and the battery charger output current $I_{OUTPUT}$ (see FIG. 6) decrease, the PWM switching frequency (as illustrated by the charging signal PWM; see FIG. 6) also decreases. The switching losses due to the power MOSFET switches FETH1, FETH2, FETL1, FETL2 and the inductor 220, which constitute a dominant portion of the total power losses of the battery charging system 200a, are proportional to the PWM switching frequency. Lowering the PWM switching frequency in the energy saving mode ES1 can therefore significantly improve the power efficiency.

In one embodiment, the main system components 212 (see FIG. 2) can be part of a laptop or tablet computer, which can typically receive a maximum current of about 8 amps from the battery charging system 200a. In this case, the main system components 212 can start to operate in the energy saving mode ES1 when the battery charger output current $I_{OUTPUT}$ is equal to about 1 amp at an output voltage of about 8.4 volts. If a corresponding AC adapter voltage ($V_{ADP}$) is about 19 volts, then the predetermined current threshold level I_ES1_TH would be about 0.47 amps with an efficiency of about 93%. Further, if a current sense resistor 222 (across nodes CPSP, CPSN; see FIG. 2) for the AC adapter current $I_{ADP}$ is equal to about 5 milliOhms, then the voltage between the nodes CPSP and CPSN at the predetermined current threshold level I_ES1_TH would be about 2.35 millivolts. As the AC adapter current $I_{ADP}$ and the battery charger output current $I_{OUTPUT}$ decrease, the battery charging controller 300 (see FIG. 3a) operates with reduced power consumption by reducing the PWM switching frequency of the PWM power stage 302. The current consumption of the battery charging controller 300 while operating in the energy saving mode ES1 is less than the current consumption of the controller 300 while operating in the ES0 energy saving mode, as illustrated by a waveform $I_{VDD}$ (see FIG. 6).

Energy Saving Mode ES2

As shown in the table of FIG. 5, while the battery charging system 200a (see FIG. 2a) operates in the energy saving mode ES2, a lowest level of power among the energy saving modes ES0, ES1, ES2 can be provided by the battery charging controller 300 (see FIG. 3a), the control signal PSCTRL can be in the range of about 1.0 to 1.7 volts, the status of battery charging is denoted as "off", the main system components 212 can operate in a system standby mode, and the AC adapter can provide a level of AC adapter current $I_{ADP}$ ranging from the second reduced current threshold level to the zero current level.

As shown in FIG. 6, in the energy saving mode ES0, the frequency of PWM switching of the PWM power stage 302 (as illustrated by the charging signal PWM; see FIGS. 6 and 7) is kept substantially unchanged, based on the algorithm employed by the DPWM algorithm component 314. As further shown in FIG. 6, in the energy saving mode ES1, as the AC adapter current $I_{ADP}$ and the battery charger output current $I_{OUTPUT}$ decrease, the frequency of PWM switching decreases to a predetermined frequency threshold FREQ_ES2_TH (see FIG. 7), at which point the charger mode control component 316 transitions the energy saving mode of the energy saving component 312 from the energy saving mode ES1 to the energy saving mode ES2. Operation of the battery charging system 200a in the energy saving mode ES2 is denoted by the high logical level of a waveform "ES2", as illustrated in FIG. 7.

It is noted that the PWM switching frequency of the PWM power stage 302 (see FIGS. 3a and 3b) can be in the range of about 600 kilohertz to 8 megahertz. Further, the predetermined frequency threshold FREQ_ES2_TH (see FIG. 7) can be within the range of about 15 kilohertz to 50 kilohertz, which is above the acoustic frequency to avoid the generation of sound that might be sensitive to human hearing. The value of the predetermined frequency threshold FREQ_ES2_TH can be stored in digital form in a register in the non-volatile memory (NVM) within the digital core 310.

In the energy saving mode ES2, essentially all of the battery charger output current $I_{OUTPUT}$ flows to the main system components 212 (see FIG. 2), which are operating in the system standby mode. In the system standby mode, the power consumption of the main system components 212 can be as low as 150 milliwatts (e.g., where the battery charger output current $I_{OUTPUT}$ is about 20 mAmps, and the corresponding voltage is about 7.5 volts). Further, the battery charging controller 300 (see FIG. 3a) operates to close the switch 304 with the switch 308 placed in the high impedance state (preventing any of the battery pack voltage $V_{BATSP}$ or battery cell voltages VBATS1, VBATS2 from being provided as input(s) to the VE comparator 306), thereby allowing voltage regulation loop (which includes the VE comparator 306, the switch 308, the ADC 309, and the DAC 320) to control and/or regulate the voltage $V_{CCHGP}$ to be equal to a predetermined output voltage VCCHGP_SET (also referred to herein as "$V_{CCHGP\_SET}$"; see FIG. 7). It is noted that the value of the voltage VCCHGP_SET can be stored in digital form in a register in the non-volatile memory (NVM) within the digital core 310 (see FIG. 3a).

Figure 7:
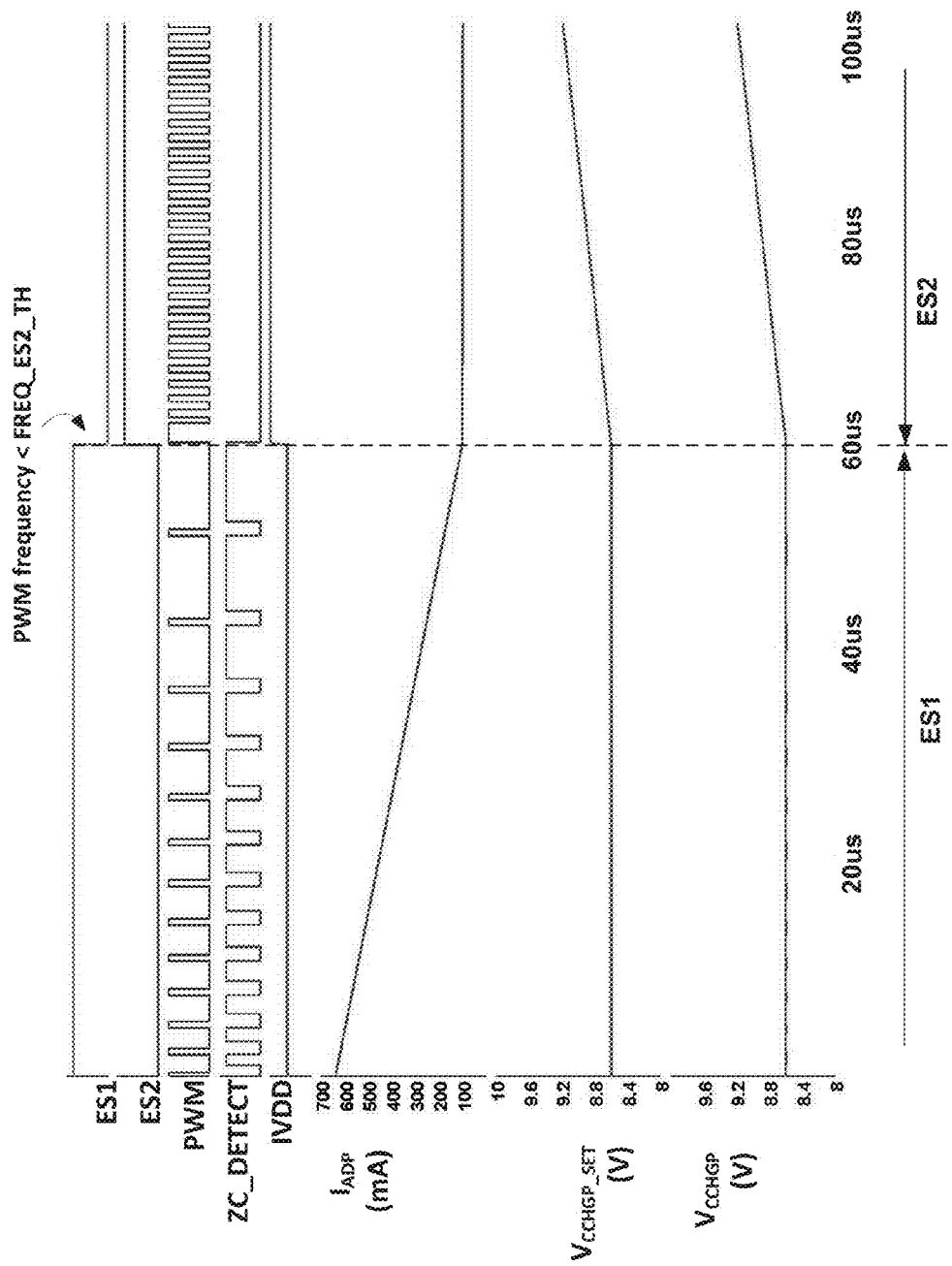
FIG. 7 is a diagram illustrating a transition from the energy saving mode ES1 to the energy saving mode ES2, during further operation of the battery charging system of FIG. 3*a*.
Figure 9:
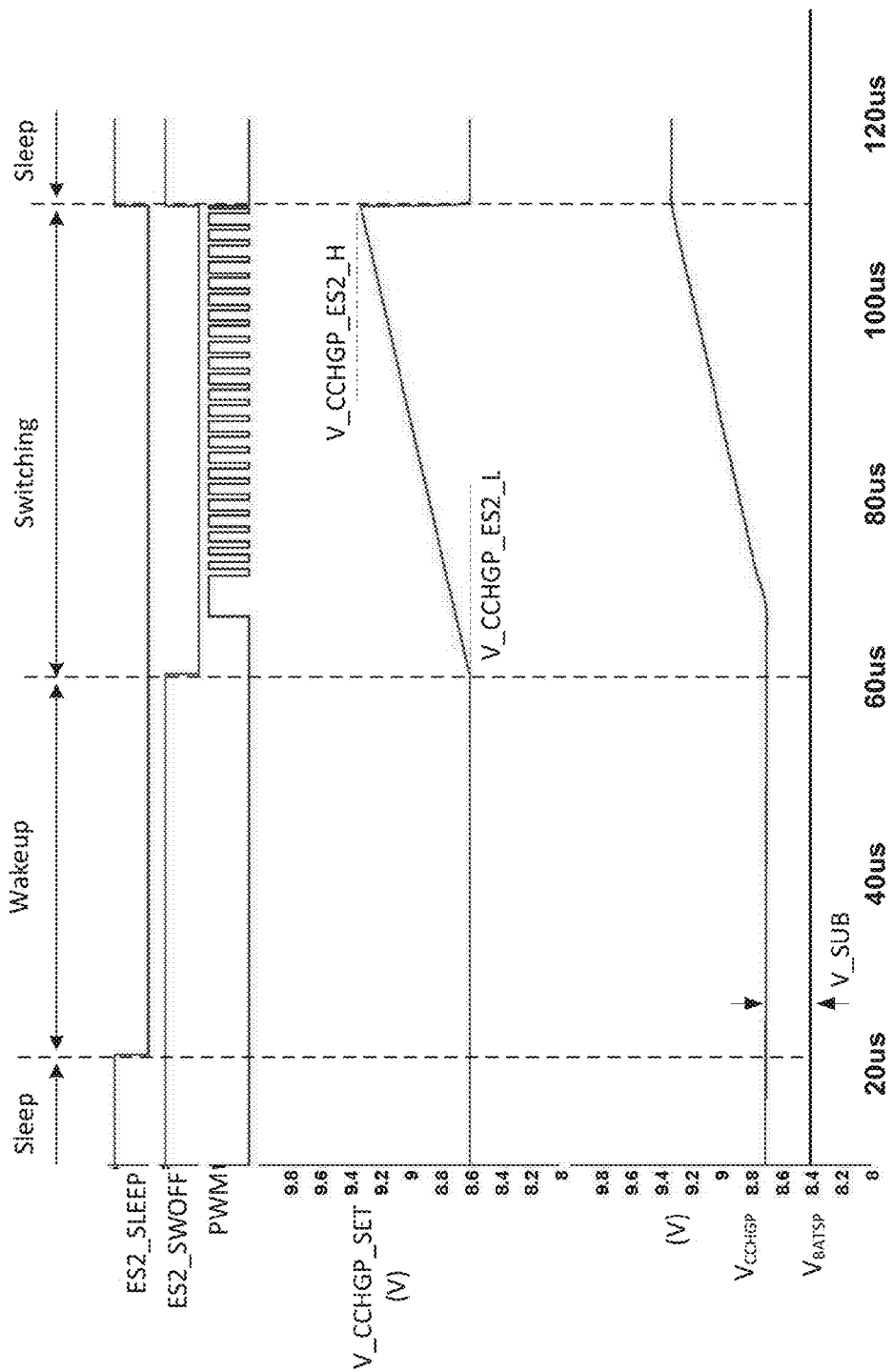
FIG. 9 is a diagram illustrating exemplary operation of the battery charging system of FIG. 3*a* while operating in "sleep", "wakeup", and "switching" periods of the energy saving mode ES2.

As shown in FIG. 7, upon entering the energy saving mode ES2, the voltage $V_{CCHGP}$ ramps up from a predetermined minimum voltage V_CCHGP_ES2_L (see FIG. 9) to a predetermined maximum voltage V_CCHGP_ES2_H (see also FIG. 9), following the level of the predetermined output voltage VCCHGP_SET (see FIGS. 7 and 9). The battery charging system 200a switches in continuous PWM pulses until the voltage $V_{CCHGP}$ reaches the predetermined maximum voltage, V_CCHGP_ES2_H. From that point, the battery charging controller 300 (see FIG. 3a) enters a "sleep" period of the energy saving mode ES2 (such sleep period also referred to herein as the "ES2_SLEEP period"), during which PWM switching within the controller 300 is either turned "off" or performed at a lower clock frequency to reduce current consumption. Further, the I2C/SMBUS within the digital core 310 enters a dormant state. It is noted, however, that the analog front-end circuits of the battery charging controller 300, including an output voltage sense circuit across the current sense resistor 216 (see FIG. 2) and an AC adapter voltage detection circuit across the current sense resistor 222 (see also FIG. 2), remain active. It is further noted that one or more suitable capacitors can be connected to the node CCHGP to store energy for supplying current to the main system components 212 while the PWM switching within the battery charging controller 300 is turned "off".

During the ES2_SLEEP period (see FIG. 8), the voltage $V_{CCHGP}$ ramps down from the predetermined maximum voltage V_CCHGP_ES2_H to the predetermined minimum voltage V_CCHGP_ES2_L, due to the current consumption ($I_{VDD}$) of the battery charging controller 300 (see FIG. 3a) being relatively low. It is noted that, during the ES2_SLEEP period, the current consumption ($I_{VDD}$) is significantly less than in either of the energy saving modes ES0 or ES1, thereby improving power efficiency.

When the voltage $V_{CCHGP}$ reaches the predetermined minimum voltage V_CCHGP_ES2_L, the battery charging controller 300 (see FIG. 3a) becomes activated to be ready to resume PWM switching. It is noted that a short period of time is required (e.g., several dozens to a few hundred microseconds) to "wake up" the various circuits of digital core 310 (such short period of time also referred to herein as the "Wakeup period"; see FIG. 9).

Once the various circuits of the digital core 310 (see FIG. 3a) have woken up, the battery charging system 200a resumes PWM switching (as illustrated in FIG. 9 with reference to a "Switching" period), and the voltage $V_{CCHGP}$ again follows the level of the voltage VCCHGP_SET, as also shown in FIG. 9. It is noted that, for the battery-operable device 200, the length of the ES2_SLEEP period is dependent upon the current drawn from the battery charging system 200a by the main system components 212. The higher the current drawn from the battery charging system 200a by the main system components 212, the shorter the length of the ES2_SLEEP period.

When the main system components 212 exit the system standby mode of operation, the processor and other electronic components draw increased current from the battery charging system 200a, reducing the length of the ES2_SLEEP period. Once the length of the ES2_SLEEP period becomes less than a predetermined minimum sleep period (also referred to herein as the "MIN_SLEEP_ES2 period"; see FIG. 8), the digital core 310 generates an ES2_EXIT signal (see FIG. 8), causing the charger mode control component 316 to transition the energy saving mode of the energy saving component 312 from the energy saving mode ES2 back to the energy saving mode ES0. The value of the MIN_SLEEP_ES2 period can be stored in digital form in a register in the non-volatile memory (NVM) within the digital core 310. The power stage 302 (see FIGS. 3a and 3b) is then activated to resume supplying current to the main system components 212 (see FIG. 2).

It is noted that, in the energy saving mode ES2, the levels of the AC adapter current $I_{ADP}$ and the battery charging current $I_{CHG}$ are relatively low. For example, the current sense signal amplitudes for the currents $I_{ADP}$, $I_{CHG}$ (obtained using the current sense resistors 222, 216, respectively) can each be less than 1 millivolt. To avoid measuring such low levels of the AC adapter current $I_{ADP}$ and the battery charging current $I_{CHG}$ (as well as the ripple current $I_{INDUCTOR}$ and the PWM switching current) during transitions between the various energy saving modes ES0, ES1, ES2, the battery charging system 200a is configured to transition from the energy saving mode ES1 to the energy saving mode ES2 based on the PWM switching frequency, and to transition from the energy saving mode ES2 to the energy saving mode ES0 based on the length of the ES2_SLEEP period.

Figure 10:
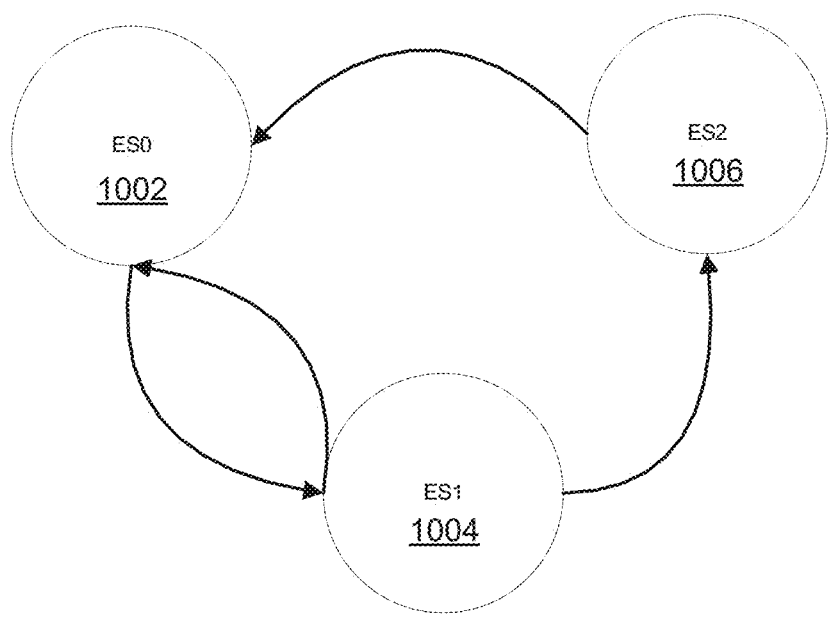
FIG. 10 is a state diagram illustrating transitions between the respective energy saving modes ES0, ES1, and ES2.

FIG. 10 depicts a state diagram illustrating the above-described transitions between the energy saving modes ES0, ES1, ES2, as well as their transition sequences and orders within the battery charging system 200a. As shown in FIG. 10, when transitioning from the energy saving mode ES2 (see reference numeral 1006), the battery charging system 200a does not transition to the energy saving mode ES1, but rather transitions directly to the energy saving mode ES0 (see reference numeral 1002). To enter the energy saving mode ES2 again in the next cycle, the battery charging system 200a transitions from the energy saving mode ES0 (see reference numeral 1002) to the energy saving mode ES1 (see reference numeral 1004), and then to the energy saving mode ES2 (see reference numeral 1006). Such transitioning between the respective energy saving modes ES0, ES1, ES2 is further described herein with reference to FIG. 11.

It is further noted that, in the energy saving mode ES2, the gate voltage of the high side MOSFET switch FETH2 is kept low, and therefore the MOSFET switch FETH2 becomes essentially dormant without any PWM switching, while the high side MOSFET switch FETH1 switches "on" and "off" in PWM cycles. Similarly, the gate voltage of the low side MOSFET switch FETL2 is kept low, and therefore the MOSFET switch FETL2 becomes essentially dormant without any PWM switching, while the low side MOSFET switch FETL1 switches "on" and "off" in PWM cycles. Just two of the four MOSFET switches FETH1, FETH2, FETL1, FETL2 (see FIG. 3b) are therefore active in the energy saving mode ES2, namely, the active switch elements FETH1 and FETL1.

Figure 11:
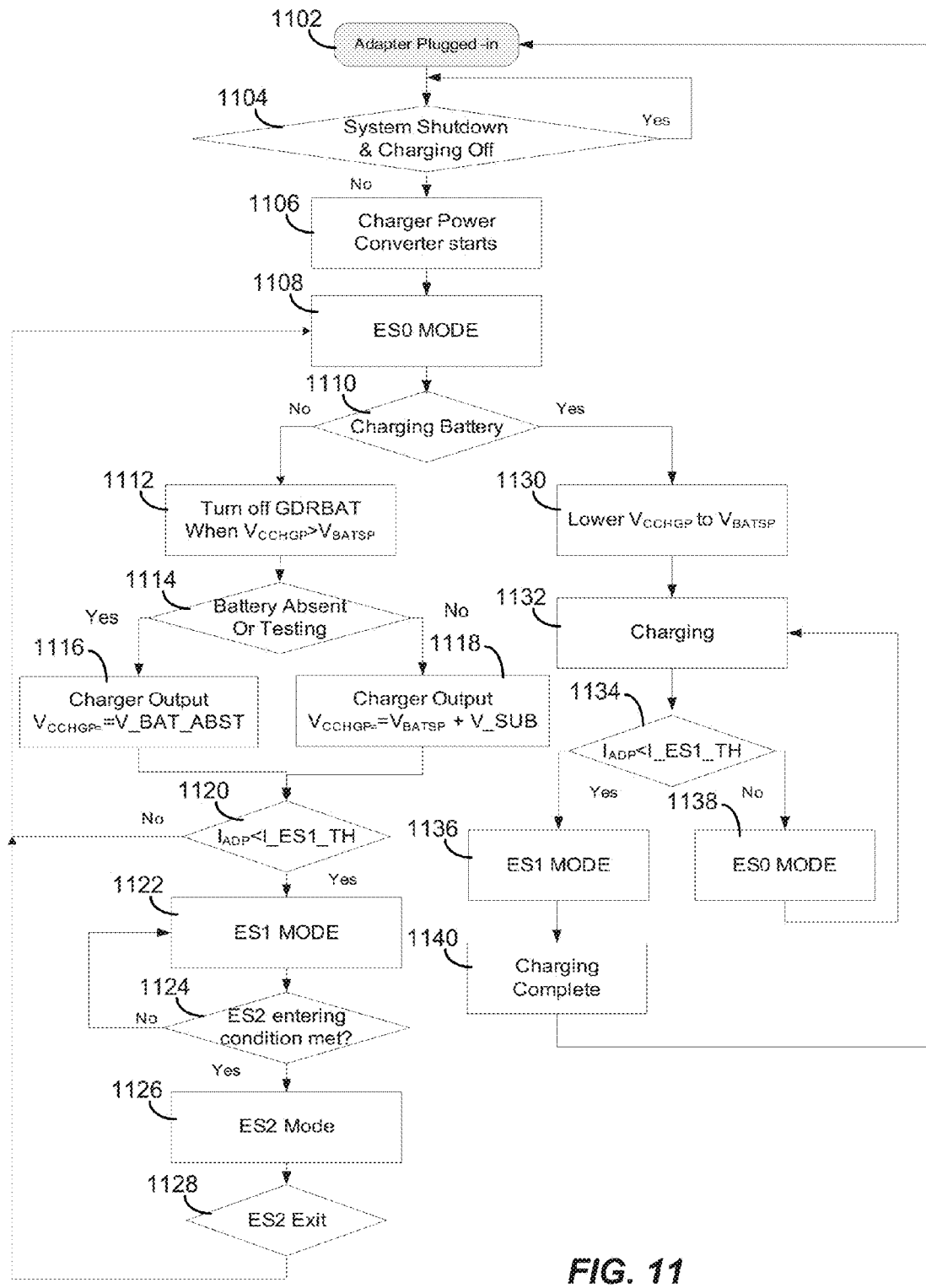
FIG. 11 is a flow diagram illustrating exemplary operation of the battery charging system of FIG. 3*a* in the respective energy saving modes ES0, ES1, and ES2.

An exemplary method of operating the battery charging system 200a in the energy saving modes ES0, ES1, and ES2 is described hereinbelow with reference to FIG. 11, as well as FIG. 2. As depicted in block 1102 (see FIG. 11), an AC adapter is plugged into the AC adapter input port 204 (see FIG. 2) of the battery charging system 200a. As depicted in block 1104, a determination is made as to whether the main system components 212 are shutdown and battery charging is "off". In the event the main system components 212 are shutdown and battery charging is "off", the method loops back to block 1104. Otherwise, the method proceeds to block 1106, at which point the battery charging system 200a begins operation. As depicted in block 1108, the battery-operable device 200 enters the energy saving mode ES0.

As depicted in block 1110 (see FIG. 11), a determination is made as to whether charging of the battery pack 214 (see FIG. 2) is currently being performed. In the event charging of the battery pack 214 is not currently being performed, a gate drive voltage is applied to the battery switch 218 at the node GDRBAT to deactivate the battery switch 218 (see FIG. 2) when the voltage $V_{CCHGP}$ becomes greater than the battery pack voltage $V_{BATSP}$, as depicted in block 1112. As depicted in block 1114, a determination is made as to whether the battery pack 214 is removed or otherwise absent from the battery-operable device 200 or testing is being performed. In the event the battery pack 214 is not removed or otherwise absent from the battery-operable device 200 and testing is not being performed, the voltage $V_{CCHGP}$ is controlled and/or regulated to be equal to the sum of the battery pack voltage $V_{BATSP}$ and the programmable voltage V_SUB (the Charging OFF period; see FIG. 4), as depicted in block 1118. Otherwise, the voltage $V_{CCHGP}$ is controlled and/or regulated to be equal to the voltage V_BAT_ABST (the battery absent/testing period 410; see FIG. 4). As depicted in block 1120, a determination is made as to whether the AC adapter current $I_{ADP}$ is less than the predetermined current threshold, I_ES1_TH. In the event the AC adapter current $I_{ADP}$ is not less than I_ES1_TH, the method loops back to block 1108. Otherwise, the method proceeds to block 1122, at which point the battery-operable device 200 enters the energy saving mode ES1. As depicted in block 1124, a determination is made as to whether a first condition for entering the energy saving mode ES2 has been met (such first condition corresponding to the frequency of PWM switching decreasing to the predetermined frequency threshold FREQ_ES2_TH; see FIG. 7). In the event the condition for entering the energy saving mode ES2 has not been met, the method loops back to block 1122. Otherwise, the method proceeds to block 1126, at which point the battery charging system 200a enters the energy saving mode ES2. In the event a second condition for exiting the energy saving mode ES2 has been met (such second condition corresponding to the length of the ES2_SLEEP period becoming less than the predetermined minimum sleep period MIN_SLEEP_ES2; see FIG. 8), the battery charging system 200a exits the energy saving mode ES2, as depicted in block 1128, and the method loops back to block 1108.

As described hereinbefore with reference to block 1110, a determination is made as to whether charging of the battery pack 214 is currently being performed. In the event charging of the battery pack 214 is currently being performed, the voltage $V_{CCHGP}$ is controlled and/or regulated to be equal to the battery pack voltage $V_{BATSP}$, as depicted in block 1130, and charging of the battery pack 214 is performed, as depicted in block 1132. As depicted in block 1134, a determination is made as to whether the AC adapter current $I_{ADP}$ from the AC adapter input port 204 is less than the predetermined current threshold I_ES1_TH. In the event the AC adapter current $I_{ADP}$ is less than the predetermined current threshold I_ES1_TH, the battery charging system 200a enters the energy saving mode ES1, as depicted in block 1136. As depicted in block 1140, once charging of the battery pack 214 is completed, the method loops back to block 1102. In this way, the battery charging system 200a can, as appropriate, transition from the energy saving mode ES1 (see block 1136) to the energy saving mode ES0 (see block 1108). See also the state diagram of FIG. 10, which illustrates such transitioning from the energy saving mode ES1 (see reference numeral 1004) to the energy saving mode ES0 (see reference numeral 1002). In the event the AC adapter current $I_{ADP}$ is not less than the predetermined current threshold I_ES1_TH, the battery charging system 200a remains in the energy saving mode ES0, as depicted in block 1138, and the method loops back to block 1132 to continue the charging of the battery pack 214.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of implementing a plurality of energy saving modes in a battery charging system, the battery charging system including an alternating current (AC) adapter input port and a pulse width modulation (PWM) power stage, the battery charging system being operable to receive an AC adapter current from the AC adapter input port, and the PWM power stage being operable to switch two or more active switch elements at a PWM switching frequency to generate an output current for charging a battery pack, the method comprising:

operating the battery charging system in a zeroth energy saving mode;

monitoring the AC adapter current from the AC adapter input port to detect a reduction in the AC adapter current to a predetermined current level;

having detected the reduction in the AC adapter current to the predetermined current level, transitioning operation of the battery charging system from the zeroth energy saving mode to a first energy saving mode;

monitoring the PWM switching frequency of the PWM power stage to detect a reduction in the PWM switching frequency to a predetermined frequency threshold, the reduction in the PWM switching frequency being in response to the reduction in the AC adapter current;

having detected the reduction in the PWM switching frequency to the predetermined frequency threshold, transitioning operation of the battery charging system from the first energy saving mode to a second energy saving mode, the PWM power stage including a first high-side switch element and a second high-side switch element connected in parallel on a high side of a buck converter switch, and a first low-side switch element and a second low-side switch element connected in parallel on a low side of the buck converter switch, the first high-side switch element being connected in series with the first low-side switch element, and the second high-side switch element being connected in series with the second low-side switch element; and while operating the battery charging system in the zeroth energy saving mode, actuating the first and second high-side switch elements of the buck converter switch substantially simultaneously.

2. The method of claim 1 wherein the battery pack is absent from the battery charging system, and wherein the method further comprises:

while operating the battery charging system in the zeroth energy saving mode, regulating an output voltage of the PWM power stage to be equal to a predetermined voltage level.

3. The method of claim 1 wherein the battery pack is present within the battery charging system, and wherein the method further comprises:

while operating the battery charging system in the zeroth energy saving mode, regulating an output voltage of the PWM power stage to be equal to a sum of a target voltage of the battery pack and a predetermined voltage level.

4. The method of claim 1 further comprising:

while operating the battery charging system in the first energy saving mode:

deactivating the second high-side switch element and the second low-side switch element of the buck converter switch; and actuating the first high-side switch element and the first low-side switch element of the buck converter switch in PWM cycles.

5. The method of claim 4 further comprising:

while operating the battery charging system in the second energy saving mode:

regulating an output voltage of the PWM power stage to be equal to a voltage ramping up from a predetermined minimum voltage level to a predetermined maximum voltage level; and performing switching of the PWM power stage in continuous PWM pulses until the output voltage of the PWM power stage reaches the predetermined maximum voltage level.

6. The method of claim 5 wherein the second energy saving mode includes a sleep period, and wherein the method further comprises:

upon reaching the predetermined maximum voltage level of the output voltage, entering the sleep period of the second energy saving mode.

7. The method of claim 6 further comprising:

during the sleep period of the second energy saving mode, performing one of terminating switching of the PWM power stage, and performing switching of the PWM power stage at a reduced PWM switching frequency.

8. The method of claim 6 further comprising:

during the sleep period of the second energy saving mode, regulating the output voltage of the PWM power stage to be equal to a voltage ramping down from the predetermined maximum voltage level to the predetermined minimum voltage level.

9. The method of claim 8 further comprising:

upon reaching the predetermined minimum voltage level of the output voltage, resuming switching of the PWM power stage at the PWM switching frequency.

10. The method of claim 6 wherein a duration of the sleep period is reduced as the output current of the PWM power stage is increased, and wherein the method further comprises:

monitoring the duration of the sleep period to detect a reduction in the duration of the sleep period to a predetermined minimum sleep period.

11. The method of claim 10 further comprising:

having detected the reduction in the duration of the sleep period to the predetermined minimum sleep period, transitioning operation of the battery charging system from the second energy saving mode to the zeroth energy saving mode.

12. The method of claim 1 further comprising:

while operating the battery charging system in the second energy saving mode:

deactivating the second high-side switch element and the second low-side switch element of the buck converter switch; and actuating the first high-side switch element and the first low-side switch element of the buck converter switch in PWM cycles.

13. The method of claim 1 further comprising:

generating the output current for charging the battery pack; and while charging the battery pack, regulating an output voltage of the PWM power stage to be equal to a target voltage of the battery pack.

14. The method of claim 13 further comprising:

upon reaching the predetermined current level of the AC adapter current:

transitioning operation of the battery charging system from the zeroth energy saving mode to the first energy saving mode; and completing the charging of the battery pack.

15. The method of claim 14 further comprising:

upon completion of the charging of the battery pack, transitioning operation of the battery charging system from the first energy saving mode to the zeroth energy saving mode.

16. A battery charging system for delivering battery power to a battery-operable device, comprising:

a battery charging controller including a digital core circuit, a charger mode control circuit component, and an energy saving circuit component;

an alternating current (AC) adapter input port;

a battery pack; and a pulse width modulation (PWM) power stage including a plurality of active switch elements for implementing, at a PWM switching frequency, a PWM switching scheme to provide a battery charging output to the battery pack, wherein the digital core circuit is operative:

to regulate the battery charging output during at least a pre-charging period, a current-controlled charging period, and a voltage-controlled charging period of the battery pack;

during one or both of the current-controlled charging period and the voltage-controlled charging period of the battery pack, to control the charger mode control circuit component to operate the energy saving circuit component in a zeroth energy saving mode of the battery charging system;

to monitor an AC adapter current from the AC adapter input port to detect a reduction in the AC adapter current to a predetermined current level;

having detected the reduction in the AC adapter current to the predetermined current level, to control the charger mode control circuit component to transition the energy saving circuit component from operating in the zeroth energy saving mode to a first energy saving mode of the battery charging system;

to monitor the PWM switching frequency of the PWM power stage to detect a reduction in the PWM switching frequency to a predetermined frequency threshold, the reduction in the PWM switching frequency being in response to the reduction in the AC adapter current;

having detected the reduction in the PWM switching frequency to the predetermined frequency threshold, to control the charger mode control circuit component to transition the energy saving circuit component from operating in the first energy saving mode to a second energy saving mode of the battery charging system, wherein the PWM power stage includes a first high-side switch element and a second high-side switch element connected in parallel on a high side of a buck converter switch, and a first low-side switch element and a second low-side switch element connected in parallel on a low side of the buck converter switch, the first high-side switch element being connected in series with the first low-side switch element, and the second high-side switch element being connected in series with the second low-side switch element; and while operating the energy saving circuit component in the zeroth energy saving mode, to actuate the first and second high-side switch elements of the buck converter switch substantially simultaneously.

17. The battery charging system of claim 16 wherein the digital core circuit is further operative, during the pre-charging period of the battery pack, to control the charger mode control circuit component to operate the energy saving circuit component in the first energy saving mode of the battery charging system.

18. The battery charging system of claim 16 wherein the battery-operable device is configured to operate in a system standby mode, and wherein the digital core circuit is further operative, while the battery-operable device operates in the system standby mode, to control the charger mode control circuit component to operate the energy saving circuit component in the second energy saving mode of the battery charging system.

19. A method of a battery charging system for delivering battery power to a battery-operable device, comprising:

regulating, by a digital core circuit within a battery charging controller, a battery charging output of a pulse width modulation (PWM) power stage during at least a current-controlled charging period and a voltage-controlled charging period of a battery pack, the battery charging controller including a charger mode control circuit component and an energy saving circuit component;

during one or both of the current-controlled charging period and the voltage-controlled charging period of the battery pack, controlling the charger mode control circuit component to operate the energy saving circuit component in a zeroth energy saving mode of the battery charging system;

monitoring, by the digital core circuit, an AC adapter current from an AC adapter input port of the battery charging system to detect a reduction in the AC adapter current to a predetermined current level;

having detected the reduction in the AC adapter current to the predetermined current level, controlling the charger mode control circuit component to transition the energy saving circuit component from operating in the zeroth energy saving mode to a first energy saving mode of the battery charging system;

monitoring, by the digital core circuit, a PWM switching frequency of the PWM power stage to detect a reduction in the PWM switching frequency to a predetermined frequency threshold, the reduction in the PWM switching frequency being in response to the reduction in the AC adapter current;

having detected the reduction in the PWM switching frequency to the predetermined frequency threshold, controlling the charger mode control circuit component to transition the energy saving circuit component from operating in the first energy saving mode to a second energy saving mode of the battery charging system, the PWM power stage including a first high-side switch element and a second high-side switch element connected in parallel on a high side of a buck converter switch, and a first low-side switch element and a second low-side switch element connected in parallel on a low side of the buck converter switch, the first high-side switch element being connected in series with the first low-side switch element, and the second high-side switch element being connected in series with the second low-side switch element; and while operating the energy saving circuit component in the zeroth energy saving mode, actuating the first and second high-side switch elements of the buck converter switch substantially simultaneously.

20. The method of claim 19 further comprising, while the battery-operable device operates in a system standby mode of operation, controlling the charger mode control circuit component to operate the energy saving circuit component in the second energy saving mode of the battery charging system.

* * * * *